United States Patent
Mulin et al.

(10) Patent No.: US 9,081,263 B2
(45) Date of Patent: Jul. 14, 2015

(54) CAMERA SET UP FOR FITTING ON BOARD A VEHICLE

(75) Inventors: Alice Mulin, Noironte (FR); Caroline Robert, Paris (FR)

(73) Assignee: Valeo Vision, Bobigny (FR)

( * ) Notice: Subject to any disclaimer, the term of this patent is extended or adjusted under 35 U.S.C. 154(b) by 323 days.

(21) Appl. No.: 13/040,454

(22) Filed: Mar. 4, 2011

(65) Prior Publication Data

US 2011/0216197 A1 Sep. 8, 2011

(30) Foreign Application Priority Data

Mar. 5, 2010 (FR) .................................... 10 51602

(51) Int. Cl.
| | | |
|---|---|---|
| H04N 13/02 | (2006.01) | |
| G03B 13/32 | (2006.01) | |
| G02B 13/00 | (2006.01) | |
| G03B 15/00 | (2006.01) | |
| G03B 17/12 | (2006.01) | |
| G03B 19/02 | (2006.01) | |
| B60S 1/08 | (2006.01) | |

(52) U.S. Cl.
CPC .............. *G03B 13/32* (2013.01); *G02B 13/001* (2013.01); *G03B 15/00* (2013.01); *G03B 17/12* (2013.01); *G03B 19/023* (2013.01); *B60S 1/0844* (2013.01)

(58) Field of Classification Search
CPC ........ H04N 7/18; G03B 13/32; G03B 13/001; G03B 15/00; G03B 17/12; G03B 19/023
USPC .............. 348/36, 335, 148; 250/338; 396/73; 623/11
See application file for complete search history.

(56) References Cited

U.S. PATENT DOCUMENTS

| | | | |
|---|---|---|---|
| 3,887,930 A * | 6/1975 | Bresson | 396/73 |
| 7,742,096 B2 * | 6/2010 | Murakami | 348/335 |
| 7,863,568 B2 * | 1/2011 | Fleury | 250/338.1 |
| 8,180,099 B2 * | 5/2012 | Heenan et al. | 382/100 |
| 2008/0111075 A1 | 5/2008 | Fleury | |
| 2009/0128629 A1 | 5/2009 | Egbert et al. | |
| 2011/0069148 A1 * | 3/2011 | Jones et al. | 348/36 |
| 2013/0046381 A1 * | 2/2013 | Zalevsky et al. | 623/6.11 |

FOREIGN PATENT DOCUMENTS

| | | | | |
|---|---|---|---|---|
| DE | 102004015040 A1 * | 10/2005 | | B60R 1/00 |
| EP | 1923280 A1 | 5/2008 | | |
| EP | 1923695 A1 | 5/2008 | | |
| EP | 2062777 A1 | 5/2009 | | |
| WO | 2006015905 A1 | 2/2006 | | |

\* cited by examiner

*Primary Examiner* — William C Vaughn, Jr.
*Assistant Examiner* — Naod Belai
(74) *Attorney, Agent, or Firm* — Jacox, Meckstroth & Jenkins

(57) ABSTRACT

A camera set up for fitting on board a motor vehicle. The camera has an electronic sensor, a multifocal, particularly bifocal optical device, an optical lens focused in long-range field, the multifocal optical device and the optical lens being set up to be able to form a first image (IM1) on the sensor, focused in long-range field, and a second image (IM2) focused in close-range field, these first and second images extending into respective distinct regions of the sensor.

10 Claims, 1 Drawing Sheet

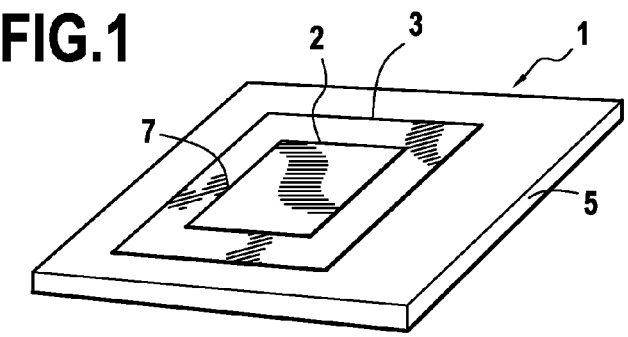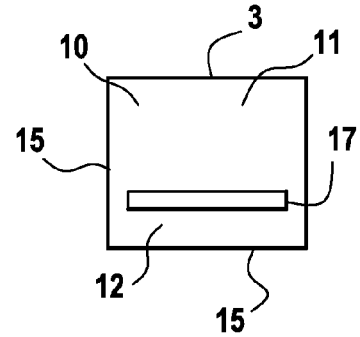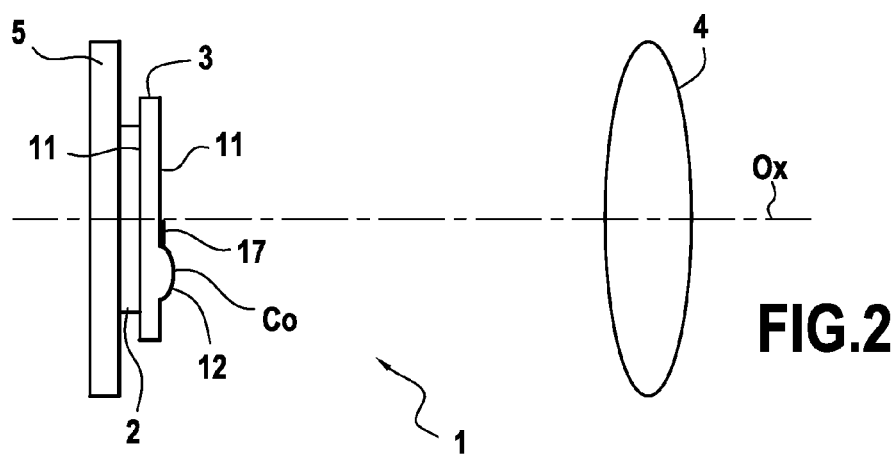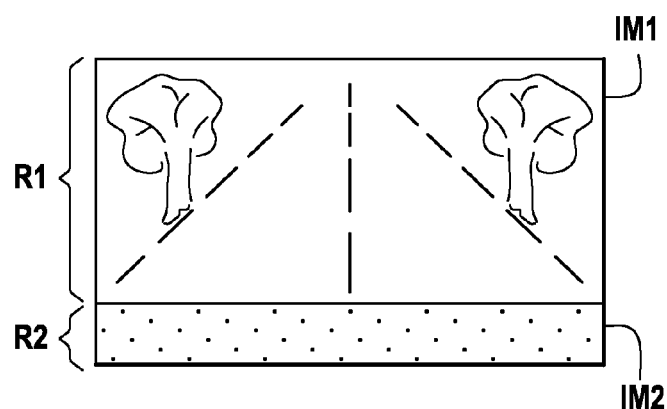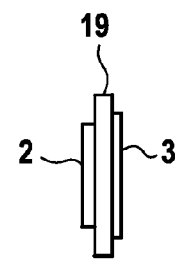

CAMERA SET UP FOR FITTING ON BOARD A VEHICLE

CROSS-REFERENCE TO RELATED APPLICATIONS

This application claims priority to French Application No. 1051602 filed Mar. 5, 2010, which application is incorporated herein by reference and made a part hereof.

BACKGROUND OF THE INVENTION

1. Field of the Invention

The invention particularly concerns a camera which is set up for fitting on board a vehicle.

2. Description of the Related Art

The patent application EP 1 923 280, which is equivalent to U.S. Pat. No. 7,863,568, which is incorporated herein by reference and made a part hereof, is known as a photosensitive sensor which may serve several applications.

Currently, for a vehicle, rain is detected with the aid of a rain sensor separate from the front camera. This is used for driving aid functions that require long-range field vision (approximately to 150 meters).

In order to make the system more compact and less costly than at present, it is envisaged to integrate rain detection function into a multifunctional camera of the motor vehicle.

The invention thus particularly aims to obtain playback, with the aid of a single camera, of both the scenario of the road in long-range field (at approximately 150 meters) and the windscreen (approximately 30 mm).

The patent application WO 2006/015905 is known as an on-board optical module. Rain detection takes place by the addition of an element outside the camera. The setting up of this system may pose a problem at the level of size and positioning (alignment etc.).

SUMMARY OF THE INVENTION

One object of the invention is therefore a camera set up for fitting on board a motor vehicle, comprising:
  an electronic sensor;
  a multifocal, particularly bifocal, optical device; and
  an optical lens particularly focused on long-range field;
  the multifocal optical device and the optical lens being set up so as to be able to form a first image on the sensor, focused in long-range field, and a second image focused on close-range field, these first and second images extending into respective distinct regions of the sensor.

In other words, according to the invention, these first and second images cannot completely overlap. Possibly, these images may partially overlap. These images may even be juxtaposed, significantly without overlapping.

According to the invention, the camera is preferably used to detect rain, particularly raindrops on the windscreen of the vehicle, and also preferably, for one or more other driving aid functions such as detecting obstacles on the road, headlight automation, line detection, fog detection, visibility measurement etc.

The camera according to the invention may thus be a multifunctional camera.

The image focused in long-range field may, if one so wishes, cover a greater surface area on the sensor than that covered by the image in close-range field on the sensor.

For example, the image in long-range field may cover approximately 80% of the surface area of the sensor, and the image in close-range field approximately 20% of the surface area of the sensor.

The invention makes it possible to obtain on the sensor, if required, a first clear image of drops of water on the windscreen, and in the background, within the same image, the scenario of the road which is blurred, significantly juxtaposed to a second clear image of the scenario of the road, even if there are drops of water on the windscreen.

Thus, the advantages of a clear vision to the infinite and clear vision in close-range field are simultaneously preserved.

The algorithms of detection may thus be applied on the zone of the image corresponding to their need, in optimal fashion.

Each part of the image is in some way optimal for each category of software: optimal for the detection of drops with the part focused in close-range field and optimal for applications in long-range field with the part of the image focused to the infinite.

In one example of commissioning the invention, the multifocal device is placed between the sensor and the lens.

The invention makes it possible to have a reduced size, and a relatively simple and reasonably cheap camera.

Advantageously, the camera comprises a support, particularly comprising a printed circuit board, upon which the sensor is placed.

The multifocal optical device may be integral with this support or, as a variant, its bifocal device may be distant, being for example in contact with and/or integral with the lens, or even distant both to the support and the lens.

Preferably the camera comprises a sensor protection blade, for example, the multifocal optical device is placed side by side, particularly stuck onto, this protection blade.

If required, the multifocal optical device is placed directly in front of the sensor, and preferably also serves to protect the sensor.

In one example of commissioning the invention, the multifocal optical device comprises a blade, particularly in plastic or glass, made of N-BK7, for example.

The multifocal device is preferably made from a single piece.

As a variant, the multifocal device comprises several elements, possibly assembled together.

In one example of commissioning the invention, the multifocal device comprises an optically neutral zone associated with the first image in long-range field, formed for example between two significantly parallel main sides of the device, and an optically active zone associated with the second image in close-range field, this optically active zone being particularly a zone that forms a convergent lens.

The optically active zone serves particularly to image a sufficient zone of the windscreen on the sensor.

If required, the optically active zone is distant from the edges of the multifocal device, particularly from the edges of the blade whenever this zone is formed on the blade.

If required, the lens presents an optical axis, and the optically active zone presents an optic center which is shifted relative to the optical axis of the lens.

In optics, the optical center represents a particular point of a system, such that a light ray falling upon this point is not deviated: its incident emerging parts are parallel to each other.

This de-centering particularly makes it possible to partition the sensor in the best possible way.

If required, the multifocal device comprises an optically neutral zone, particularly formed between two significantly parallel main sides of the device, and an optically active zone, this optically active zone being of a material different to that of the optically neutral zone.

The positioning of the bifocal device is preferably fixed between the camera's lens and its sensor.

Advantageously, the multifocal device comprises a region forming a mask arranged between an optically neutral zone and an optically active zone, this region forming a mask being set up to limit the overlapping between the first and second images on the sensor.

This mask may be related to the blade of the multifocal device or, as a variant, be formed directly on the blade.

This mask makes it possible to cut the light rays coming from the windscreen, and these are focused in the overlapping zone of the first and second images, giving better juxtaposition of the two images.

If required, the multifocal device, particularly the blade, does not present symmetry of revolution, particularly being of non-circular shape.

The blade, for example, presents a significantly rectangular shape.

The invention also has as its object a control procedure of one or more motor vehicle windscreen-wipers, comprising the following steps:

to detect the presence of rain on the windscreen of the vehicle with the aid of a camera as defined above; and to turn on the wiper or wipers if there is rain on the windscreen.

According to one embodiment of the invention, rain detection preferably takes place by means of the multifunctional camera, without the aid of a sensor separate from this camera.

One embodiment of the invention has the further object of a rain detection procedure using a camera as defined above.

BRIEF DESCRIPTION OF THE ACCOMPANYING DRAWINGS

One embodiment of the invention may be better understood upon reading the following detailed description, of non-limiting examples of commissioning the invention, and upon examining the attached drawing, on which:

FIG. 1 partially represents, in diagram form, elements of a camera according to one example of commissioning the invention;

FIG. 2 partially represents, in diagram form, following a different view, elements of the camera of FIG. 1;

FIG. 3 partially represents, in diagram form, a bifocal device of the camera of FIGS. 1 and 2;

FIG. 4 shows, in diagram form, images on the sensor of the camera; and

FIG. 5 illustrates another example of completion of the invention.

DETAILED DESCRIPTION OF THE PREFERRED EMBODIMENTS

FIGS. 1 and 2 represent different elements of a camera 1, in accordance with one example of commissioning the invention, set up for fitting on board a motor vehicle, this camera 1 comprising:

a photosensitive electronic sensor 2, having a matrix of photosensitive cells;

a bifocal optical device 3, of significantly rectangular shape; and an optical lens 4 (FIG. 2) focused on long-range field.

Bifocal optical device 3 and optical lens 4 are set up to be able to form a first image IM1, on sensor 2, focused on long-range field, and a second image IM2 focused on close-range field, as illustrated in FIG. 4.

The camera 1 is placed advantageously within a wiped zone inside the vehicle.

For example, the camera 1 is placed behind the interior rear-view mirror, against the vehicle's windscreen.

The first and second images IM1 and IM2 extend into the respective distinct regions R1 and R2, of the sensor 2.

In other words, according to the invention, these first and second images IM1 and IM2 do not completely overlap. Possibly, these images IM1 and IM2 may partially overlap. As a variant, these images IM1 and IM2 may be juxtaposed, substantially without overlapping.

Camera 1 is used for rain detection, particularly raindrops on the vehicle's windscreen, and also for one or more other driving aid functions such as the detection of obstacles on the road, headlight automation, line detection, fog detection, visibility measurement etc.

Camera 1 is thus a multifunctional camera.

Image IM1 focused on long-range field may, if required, cover a greater surface area on the sensor 2 than that covered by image IM2 in close-range field on the sensor 2.

For example, image IM1 in long-range field may cover approximately 80% the surface area of sensor 2, and image IM2 in close-range field approximately 20% of the surface area of sensor 2.

The invention makes it possible to obtain a clear first image IM2, on sensor 2, of drops of water on the windscreen and, in the background, within the same image, the scenario of the road which is blurred, substantially juxtaposed to a second clear image IM1 of the scenario of the road, even if there are drops of water on the windscreen.

In the example described, bifocal optical device 3 is placed between sensor 2 and lens 4.

In one non-limiting example of the invention, camera 1 comprises a support 5, particularly comprising a printed circuit board upon which sensor 2 is placed.

Bifocal optical device 3 may be integral with this support 5, as can be seen on FIG. 1.

As a variant, bifocal optical device 3 is in contact with and/or integral with lens 4.

As a further variant, bifocal optical device 3 is placed between sensor 2 and lens 4, being integral with neither sensor 2 of support 5 nor lens 4.

In the example of FIGS. 1 and 2, bifocal optical device 3 is placed directly in front of sensor 2 and is also used to protect sensor 2.

Bifocal optical device 3 comprises a blade 7, made of N-BK7.

This bifocal optical device 3 comprises an optically neutral zone 10 (associated with IM1) formed between two significantly parallel main sides 11 of the bifocal optical device 3, and an optically active zone 12 (associated with IM2), this optically active zone 12 being a zone which, for example, forms a convergent lens.

Optically active zone 12 is kept away from the edges 15 of the bifocal optical device 3, particularly from the edges of the blade 7 whenever this optically active zone 12 is formed on blade 7.

This optically active zone 12, for example, presents a convex shape.

Lens 4 presents an optical axis Ox, and optically active zone 12 presents an optical center CO which is shifted relative to optical axis Ox of the lens 4.

In one example of completion, lens 4 is formed by a set of lenses associated so as to image to infinity at a focal point. Lens 4 is advantageously placed in such a way that the focal point of the set of lenses is located on sensor 2, taking into account the optical elements crossed.

Bifocal optical device 3 comprises a region forming a mask 17, arranged between the optically neutral zone 10 and the optically active zone 12, this region forming a mask 17 being set up to limit the overlapping between the first and second images IM1 and IM2 on the sensor 2.

Of course, the invention is not limited to the example just described.

For example, bifocal optical device 3 may comprise two elements which are separate and assembled together.

For example, the optically active zone 12 may be formed on a lens 4 separate from the optically neutral zone 10.

As illustrated on FIG. 5, the camera 1 may comprise a protection blade 19 of sensor 2, and the bifocal optical device 3 is, for example, placed side by side with, particularly stuck onto, this protection blade 19.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A camera set up for fitting on board a motor vehicle, comprising:
    an electronic sensor;
    a multifocal optical device, particularly bifocal; and an optical lens focused on long-range field;
    said multifocal optical device and said optical lens being set up to form a first image (IM1) on said electronic sensor, focused in long-range field, and a second image (IM2) focused on close-range field, said first and second images extending into respective distinct regions of said electronic sensor, wherein said first image (IM1) is substantially juxtaposed to said second image (IM2), wherein said first image (IM1) covers a greater surface area of the sensor than that covered by said second image (IM2);
    wherein said electronic sensor is mounted on a support and said multifocal optical device is placed between said electronic sensor and said optical lens,
    wherein said multifocal optical device comprises an optically neutral zone formed particularly between two significantly parallel main sides of said multifocal optical device, and an optically active zone, said optically active zone being particularly a zone that forms a convergent lens.

2. The camera according to claim 1, wherein said camera comprises said support comprising a printed circuit board upon which said electronic sensor is placed, said multifocal optical device being integral with said support.

3. The camera according to claim 2, wherein said camera comprises a protection blade of said electronic sensor, said multifocal optical device and said protection blade being placed side by side.

4. The camera according to claim 1, wherein said multifocal optical device is placed directly in front of said electronic sensor and preferably serves also to protect said electronic sensor.

5. The camera according to claim 1, wherein said multifocal optical device comprises a blade, particularly made of glass.

6. The camera according to claim 1, wherein said optically active zone is distant from edges of said multifocal optical device.

7. The camera according to claim 1, wherein said convergent lens presents an optical axis (Ox), wherein said optically active zone presents an optical center which is shifted relative to said optical axis of said convergent lens.

8. The camera according to claim 1, wherein said multifocal optical device comprises a region forming a mask arranged between an optically neutral zone and an optically active zone, said region forming a mask being particularly set up to limit overlapping between said first and second images on said electronic sensor.

9. A control procedure of one or more motor vehicle windscreen-wipers comprising the following steps:
    detecting a presence of rain on a vehicle's windscreen with the aid of said camera according to claim 1; and
    in response to the presence of rain detected on the windscreen, to turn on the wiper or wipers.

10. The control procedure according to claim 9, wherein said rain detection takes place by means of a multifunctional camera, without the aid of a sensor separate from said multifunctional camera.

* * * * *